3,159,631
N-AMINOMETHYLTETRACYCLINE DERIVATIVES
Maxwell Gordon, Elkins Park, and Blaine M. Sutton, Philadelphia, Pa., assignors to Smith Kline & French Laboratories, Philadelphia, Pa., a corporation of Pennsylvania
No Drawing. Filed Aug. 30, 1960, Ser. No. 52,758
1 Claim. (Cl. 260—268)

This invention relates to novel N-aminomethyltetracycline derivatives having improved therapeutic properties.

More specifically, the tetracycline derivatives of this invention have a broad spectrum of potent antimicrobial activity and, in addition, are characterized by greatly enhanced water solubility at all pH levels thereby providing increased speed and efficiency of antibiotic absorption. The compounds of this invention are active, for example, against the following types of organisms: Clostridium, Corynebacterium, Diplococci, Escherichia, Hemophilis, Klebsiella, Micrococci, Neisseria, Pasteurella, Salmonella, Shigella and Streptococci.

The N-aminomethyltetracyclines of this invention are represented by the following structural formula:

FORMULA I

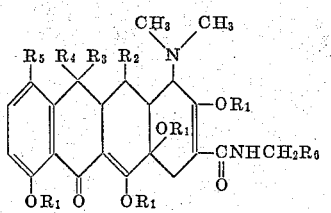

when:

$R_1$ is hydrogen;
$R_2$ is hydrogen;
$R_3$ is hydroxy;
$R_4$ is methyl;
$R_5$ is trifluoromethylsulfonyl; and
$R_6$ is N-hydroxyalkylpiperazinyl.

This invention also includes pharmaceutically acceptable salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicyclic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids.

The term "alkyl" where used herein in combination with other terms denotes hydrocarbon chains of from 2–4 carbon atoms, preferably 2 carbon atoms.

Our novel compounds are prepared by a Mannich reaction of a tetracycline compound with formaldehyde and an amine according to the following procedure:

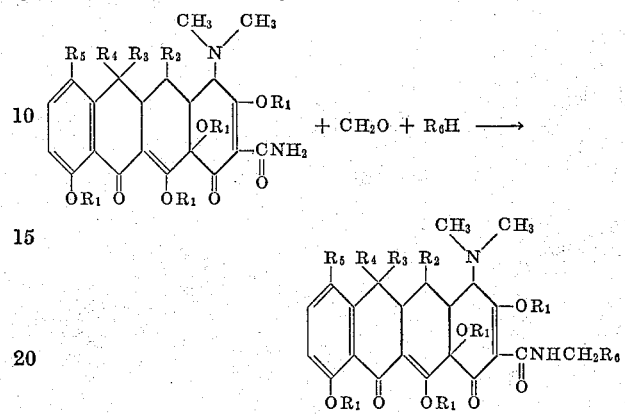

when $R_{1-6}$ are as defined hereabove.

The tetracycline starting material is reacted with at least one molar equivalent of formaldehyde and of the amine, preferably about 1.05–1.2 molar equivalents of formaldehyde and about 1.1–2.0 molar equivalents of the amine. The reaction is preferably carried out in an alcohol solvent such as ethyl, isopropyl, isoamyl or preferably, t-butyl alcohol, at elevated temperature such as from about 70–135° C. conveniently at the reflux temperature of the solvent. Preferably the reactants are stirred at room temperature for about 10–60 minutes, then heated at reflux temperature for about 10 minutes to four hours, preferably 15–30 minutes.

Example 1

A mixture of 22.2 g. of tetracycline and 33.5 g. of trifluoromethylsulfonic acid is stirred at 0° C. for 30 minutes. The cold solution is poured into ether. The precipitate is filtered off and dissolved in water. The aqueous solution is neutralized, chilled and filtered. Fractional crystallization of the solid material from ethanol gives 7-trifluoromethylsulfonyltetracycline.

To a suspension of 14.2 g. of 7-trifluoromethylsulfonyltetracycline in 150 ml. of t-butyl alcohol is added 2.3 g. of 37% formaldehyde and 3.9 g. of N-hydroxyethylpiperazine. The resulting mixture is refluxed for 30 minutes, then worked up as in Example 1 to give 7-trifluoromethylsulfonyl - N - [1-(4 - hydroxyethyl)piperazinylmethyl]tetracycline.

What is claimed is:

A chemical compound having the structural formula:

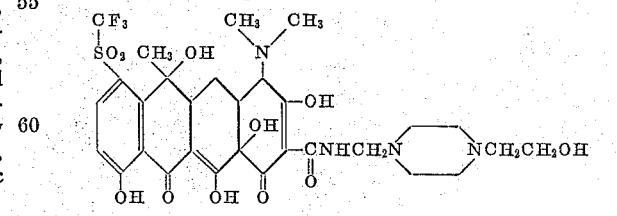

(References on following page)

References Cited in the file of this patent

UNITED STATES PATENTS

| | | |
|---|---|---|
| 2,997,471 | Cheney et al. | Aug. 22, 1961 |
| 3,029,284 | Gordon | Apr. 10, 1962 |
| 3,063,996 | Gordon | Nov. 13, 1962 |
| 3,080,288 | Tonelli et al. | Mar. 5, 1963 |
| 3,081,346 | Stephens et al. | Mar. 12, 1963 |

FOREIGN PATENTS

| | | |
|---|---|---|
| 748,724 | Great Britain | May 9, 1956 |
| 785,047 | Great Britain | Oct. 23, 1957 |
| 1,044,806 | Germany | Nov. 27, 1958 |
| 808,701 | Great Britain | Feb. 11, 1959 |
| 808,702 | Great Britain | Feb. 11, 1959 |
| 809,585 | Great Britain | Feb. 25, 1959 |
| 3169/57 | Union of South Africa | July 22, 1958 |

OTHER REFERENCES

McCormick et al.: "Journal American Chemical Society," vol. 79, pages 4561–63 (1957).

Stephens et al.: "Journal American Chemical Society," vol. 80, pages 5324–25 (1958).

Siedel et al.: "Munchenen Medizinische Wochenschrift," vol. 100, pages 661–662 (April 1958).